(12) United States Patent
Ahrens et al.

(10) Patent No.: US 8,744,990 B2
(45) Date of Patent: Jun. 3, 2014

(54) RULE BASED, PROACTIVE WEB BROWSING

(75) Inventors: Matthew Ahrens, Champaign, IL (US); Greg Muchnik, Champaign, IL (US)

(73) Assignee: Yahoo! Inc., Sunnyvale, CA (US)

(*) Notice: Subject to any disclaimer, the term of this patent is extended or adjusted under 35 U.S.C. 154(b) by 370 days.

(21) Appl. No.: 12/833,303

(22) Filed: Jul. 9, 2010

(65) Prior Publication Data

US 2012/0011095 A1  Jan. 12, 2012

(51) Int. Cl.
*G06F 17/00* (2006.01)
*G06N 5/02* (2006.01)
*G06F 17/30* (2006.01)
*G06Q 99/00* (2006.01)

(52) U.S. Cl.
CPC .............. *G06F 17/30867* (2013.01)
USPC ............................... 706/47; 705/319

(58) Field of Classification Search
CPC ........ G06N 5/025; G06N 5/04; G06Q 50/01; G06Q 30/02
USPC .............................. 706/47; 705/319
See application file for complete search history.

(56) References Cited

U.S. PATENT DOCUMENTS

| | | | | |
|---|---|---|---|---|
| 7,555,485 | B2* | 6/2009 | Soulanille | 1/1 |
| 2002/0046299 | A1* | 4/2002 | Lefeber et al. | 709/318 |
| 2003/0132958 | A1* | 7/2003 | Himmel et al. | 345/745 |
| 2004/0153373 | A1* | 8/2004 | Song et al. | 705/26 |
| 2006/0136453 | A1* | 6/2006 | Kwan | 707/101 |
| 2006/0224741 | A1* | 10/2006 | Jackson | 709/226 |
| 2009/0064010 | A1* | 3/2009 | Sojan et al. | 715/764 |
| 2009/0100322 | A1* | 4/2009 | Phillips et al. | 715/205 |
| 2009/0106433 | A1* | 4/2009 | Knouse et al. | 709/229 |
| 2010/0131441 | A1* | 5/2010 | Gruenhagen et al. | 706/45 |

OTHER PUBLICATIONS

Lai et al.; "A System Architecture of Intelligent-Guided Browsing on the Web"; System Sciences, 1998., Proceedings of the Thirty-First Hawaii International Conference on; pp. 423-432 vol. 4 ; Date of Conference: Jan. 6-9, 1998.*
Lieberman, Henry; "Letizia: An Agent That Assists Web Browsing"; AAAI Technical Report FS-95-03; pp. 97-102; 1995.*
Lierberman et al.; "Exploring the Web with Reconnaissance Agents"; Communications of the ACM Aug. 2001/vol. 44, No. 8; pp. 69-75.*
Kwon et al.; "NAMA: a context-aware multi-agent based web service approach to proactive need identification for personalized reminder systems"; Expert Systems with Applications; pp. 17-32; 2005.*

* cited by examiner

*Primary Examiner* — Alan Chen
*Assistant Examiner* — James F Sugent
(74) *Attorney, Agent, or Firm* — Hickman Palermo Truong Becker Bingham Wong LLP

(57) ABSTRACT

Method and apparatus for rule-based, proactive web browsing are provided. A set of rules is determined and stored in computer data storage, where each rule in the set of rules is a proactive browsing rule that indicates a web page. The occurrence of an event represented by event information is detected. In response to detecting the occurrence of the event, the set of rules is evaluated based on the event information to determine whether any rules are satisfied. While a web browser is in use, a determination is made that a particular rule is satisfied. In response to determining that the particular rule is satisfied, the web browser is automatically redirected to directly access a particular web page that is indicated in the particular rule.

22 Claims, 6 Drawing Sheets

RULE BASED, PROACTIVE WEB BROWSING

FIELD OF THE INVENTION

The present disclosure relates to web browsing.

BACKGROUND

Web browsing by nature is a very "reactive" process in which a software application (e.g., such as a web browser) navigates among web pages in response to user input such as, for example, a web address typed by a user or a mouse click on the currently displayed page. This "reactive" nature of the web browsing process, however, tends to diminish the quality of the user experience in certain circumstances.

For example, there are many users who have signed up for Fantasy Football leagues on Yahoo! sports. On a Sunday morning, a typical user would want to check his or her team roster before the games start. Under the current "reactive" browsing process, the user needs either to type into the browser the web address of the roster page for his or her Fantasy Football team, or to surf the "yahoo.com" web site in order to reach that roster page. For example, after logging into the "yahoo.com" web site, the user needs to click on a link to get to the sports web page, then click on a link thereon to get to the fantasy football league page, then click on a link thereon to get to the user's team page, and then click on a link therein to get to the page of the team's roster. However, each of these two cases of "reactive" browsing has its own disadvantages that diminish the quality of the user experience.

In the former case, while it may be possible for the user to type into the browser the Uniform Resource Locator (URL) address of the web page that the user wants to visit, such URL address is typically long and complicated and hence difficult to remember, especially when the URL address requires parameter values needed to locate or to dynamically generate the desired web page. In the latter case, the user needs to click through several intervening web pages which, in addition to taking extra time and being rather annoying to the user, involves retrieval of unnecessary information because the content of the intervening pages needs to be retrieved and loaded by the browser even though such content is not of interest to the user at that particular time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The techniques described herein are illustrated by way of example, and not by way of limitation, in the figures of the accompanying drawings and in which like reference numerals refer to similar elements and in which.

DETAILED DESCRIPTION

Figure 1:
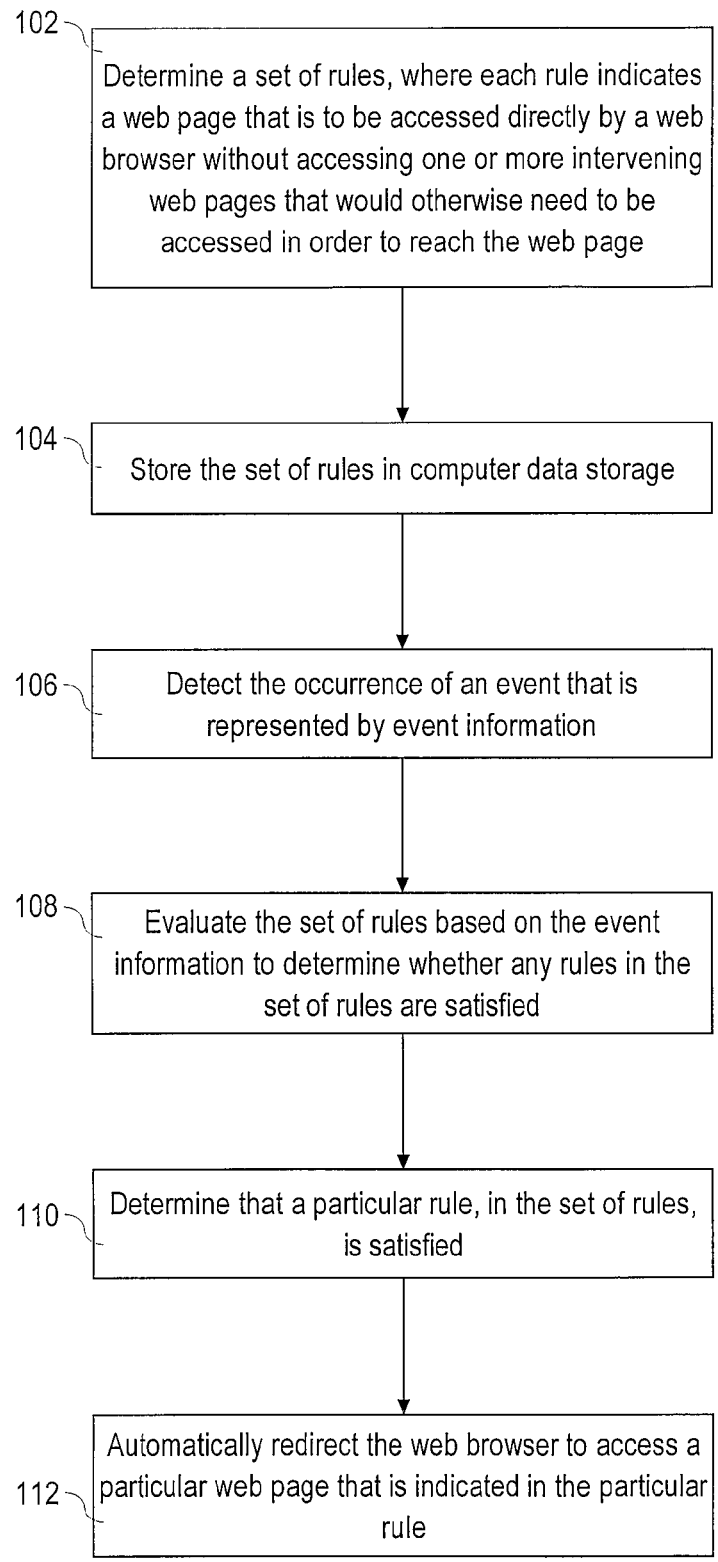
FIG. 1 is a flow diagram that illustrates an example method for proactive web browsing according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for proactive web browsing are described herein. In an example embodiment, one or more proactive browsing rules are determined and stored. As used herein, "proactive browsing rule" (or just "rule") refers to a set of data that specifies one or more conditions and at least one browsing-related action that is to be performed without receiving any additional user input when the one or more conditions are satisfied. For example, in a proactive browsing rule, an action may be associated with a web page, where the action is such that when performed it causes a web browser to directly access the web page without accessing one or more intervening web pages that would otherwise need to be accessed in order to reach that web page. In response to detecting the occurrence of an event, the conditions specified in the one or more proactive browsing rules are evaluated based on event information that represents the detected event. When the evaluation determines that the one or more conditions of a particular rule are satisfied, the action specified in the particular rule is automatically performed, for example, by automatically redirecting a web browser to access the particular web page that is indicated in the particular rule.

In this manner, the techniques described herein utilize proactive browsing rules that reflect the likely intent of a user to access certain web pages in certain contexts and/or circumstances. In response to an event that occurs in a given context or circumstance, one or more proactive browsing rules are evaluated to determine whether in the given context or circumstance the user intends to access some specific web page, and if so, the user is automatically redirected to access that specific web page. Thus, for contexts and circumstances reflected in the proactive browsing rules, the techniques described herein change the browsing experience of a user from being "reactive" (e.g., responsive to user input) to being proactive by determining what web page the user intends to access and facilitating direct access to that web page without receiving any additional input from the user.

It is noted that when describing web browsing, it is convenient to refer to a user accessing a web page even though the actual operations to access the web page are performed by a web browser or a similar application. For example, stating that "a user accesses a web page" is just a convenient way of stating that "a web browser, which is executing on a computing device used by a user, accesses a web page." Thus, in the present disclosure any references to a user visiting, reaching, navigating to, or otherwise accessing a web page are just convenient ways of stating that such browsing operations are performed by a web browser or a similar application that is running on a computing device under the user's control.

Functional Description of Example Embodiments

FIG. 1 is a flow diagram that illustrates an example method for proactive web browsing in accordance with the techniques described herein. For illustration purposes, the steps of the method in FIG. 1 are described hereinafter as being performed by a web server that is executing on one or more computing devices. However, it is noted that in various embodiments and operational contexts the steps of the method in FIG. 1 may be performed by software and/or hardware components other than a web server; for example, in some embodiments the steps of the method in FIG. 1 may be performed by a web browser that is executing on a computing device.

In step 102, a web server or a component thereof determines a set of proactive browsing rules. Each rule in the set indicates a web page that is to be accessed directly by a web browser without accessing one or more intervening web pages that would otherwise need to be accessed in order to reach the web page.

A web page (or just "page") is an online document accessible by a web browser or a similar application that is typically identified by a Uniform Resource Identifier (URI) (e.g., such as an URL). A web page may be a set of static or dynamically-generated data including, but not limited to, an image, a Portable Document Format (PDF) document, a set of binary data, and a markup language document. Examples of markup language documents include, but are not limited to, HyperText Markup Language (HTML) files, eXtensible Markup Language (XML) files, and any static, dynamically-generated, and/or stream data that conforms to HTML, XML, or to any other markup languages that are derivatives of the Standard Generalized Markup Language (SGML).

In step 104, the web server or a component thereof stores the set of proactive browsing rules in computer data storage. "Computer data storage" refers to one or more data structures that are configured to store data in one or more storage media. Examples of such data structures include, but are not limited to, records, tables, arrays, queues, lists, files, and any other formatted or unformatted data objects that can be stored on one or more storage media.

In step 106, the web server or a component thereof detects the occurrence of an event that is represented by event information. In the context of the techniques described herein, "detecting" the occurrence of an event refers to receiving, determining, discovering, identifying, or otherwise recognizing an event and/or the event information that represents the event. As used herein, "event" refers to data that is generated responsive to and indicates the completion or occurrence of a particular activity or action, and "event information" refers to a set of data that represents and identifies an event. The event information may comprise data values that are configured in any suitable format including, but not limited to, a message, a request or any similar communication, a data object, a data record, and any other formatted data entity. The activity causing an event may be performed in a computing device by executing one or more computer-implemented operations, where the one or more operations may be initiated by the computing device or components thereof and/or by another computing device. Some examples of event-causing activities include, but are not limited to, receiving a message or output from an operation performed by a local computer system, receiving a message or other communication from a remote computer system, and receiving or detecting datetime information which indicates a particular day and/or time. It is noted that the examples of events and event activities provided herein are to be considered in an illustrative rather than a restrictive sense.

In response to detecting the occurrence of the event, in step 108 the web server or a component thereof evaluates the set of proactive browsing rules to determine whether any rules in the set of rules are satisfied. For example, the web server or the component thereof evaluates one or more conditions associated with each rule based on the event information that represents the detected event.

In step 110, the web server or a component thereof determines that a particular rule, in the set of proactive browsing rules, is satisfied. For example, the web server may determine that one or more data values included in the event information match, or otherwise satisfy, the one or more conditions defined in the particular rule.

In response to determining that the particular rule is satisfied, in step 112 the web server or a component thereof automatically redirects a web browser to access a particular web page that is indicated in the particular rule. In the context of the techniques for proactive web browsing described herein, "automatically" redirecting a web browser to access a web page means causing the web browser to access the web page without receiving, from the user that is using the web browser, any additional and/or interactive input that directly or indirectly identifies the web page.

In some embodiments, as part of automatically redirecting the web browser to access a particular web page, the techniques described herein provide for causing the web browser to pop-up a dialog (e.g., a window, page, or other dialog box) that notifies the user why the redirection is occurring and allows the user to cancel the redirection. If within a certain time limit (e.g., a few seconds) the user does not provide input that cancels the redirection (e.g., the user does not click on a "Cancel" button in the pop-up), the web browser is automatically redirected to access and retrieve the particular web page. In this manner, these embodiments provide for notifying the user about why the redirection is occurring and where the redirection is going—for example, by displaying in the pop-up the name or ID of the rule that causes the redirection and the URL or other ID of the particular web page to which the web browser is to be redirected. Further, these embodiments also allow the user to cancel the redirection if the user so wishes. It is noted, however, that in these embodiments the redirection of the web browser to the particular web page is still automatic because additional user input that identifies the particular web page is not necessary; in other words, the redirection is facilitated based on the information in the proactive browsing rule that identifies the particular web page and not on any additional information that is provided by the user (e.g., such as a URL typed by the user in the pop-up dialog or a mouse click on a hypertext link to the particular web page).

Structural Description of Example Embodiments

Figure 2B:
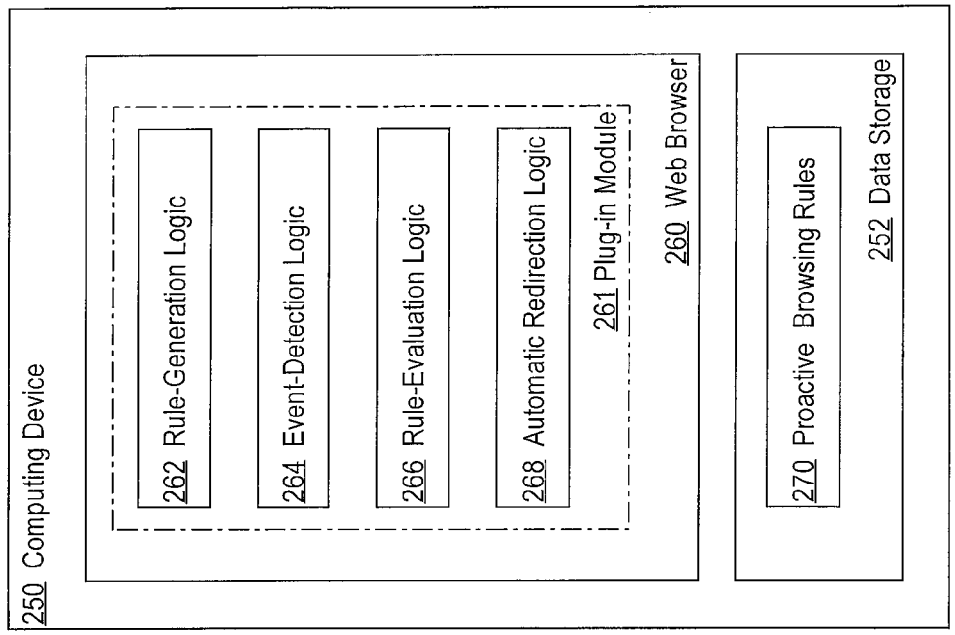
FIG. 2B is a block diagram that illustrates another example operational context according to one embodiment.
Figure 2A:
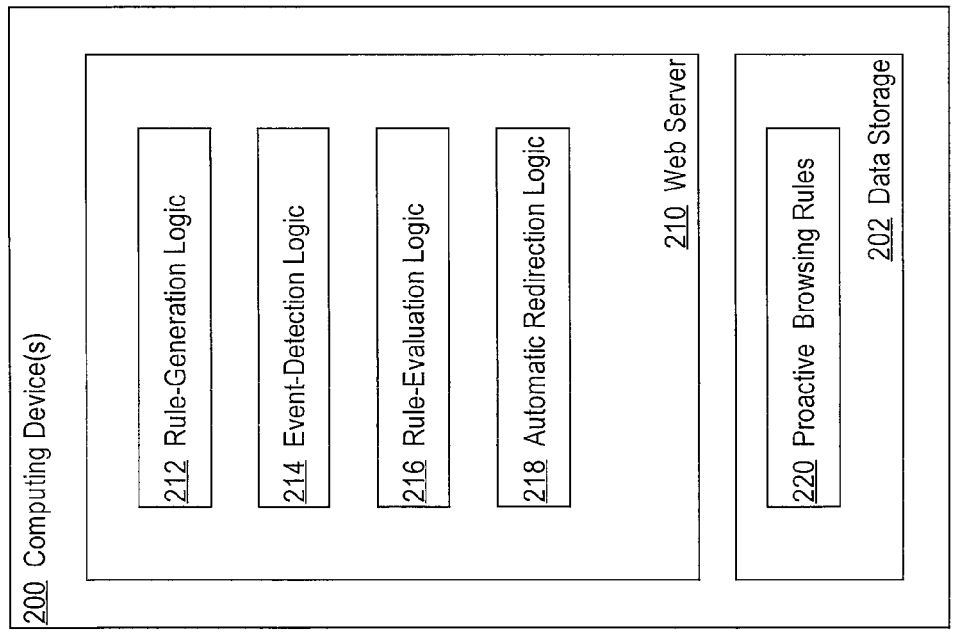
FIG. 2A is a block diagram that illustrates an example operational context according to one embodiment.

FIG. 2A is a block diagram that illustrates an example operational context in which the techniques for proactive web browsing described herein are performed by a web server.

In general, a server is a set of software and/or hardware instructions which, when executed by one or more computing devices, are allocated computational resources, such as memory, CPU time, and/or disk storage space in order to perform one or more functionalities. A web server is configured to process and service requests for web pages from various web clients (e.g., such as web browsers) over one or more protocols such as the Hypertext Transfer Protocol (HTTP), the File Transfer Protocol (FTP), and various other application, presentation, session, and transport layer protocols.

Referring to FIG. 2A, computing device(s) 200 includes computer data storage 202 and is configured to execute web server 210. Web server 210 is configured to service requests from web clients to one or more web sites (e.g., such as web portals) that include web pages. Among components (not shown in FIG. 2A) for performing the various web server functionalities, web server 210 includes rule-generation logic 212, event-detection logic 214, rule-evaluation logic 216, and automatic redirection logic 218.

As used herein, "logic" refers to a set of instructions which, when executed by one or more processors, are operable to perform one or more functionalities. In various embodiments and implementations, any such logic may be implemented as one or more software components that are executable by one or more processors or as any combination of one or more software and hardware components such as Application-Specific Integrated Circuits (ASICs). For example, any particular logic may be implemented, without limitation, as a standalone or client-server software application, as one or more software modules, as one or more libraries of functions, as one or more dynamically linked libraries, as one or more active X controls, and as one or more browser plug-ins.

Referring to FIG. 2A, in various embodiments the functionalities of rule-generation logic 212, event-detection logic 214, rule-evaluation logic 216, and automatic redirection logic 218 may be implemented as separate web server modules, in the same integrated module of the web server, or may be combined in two or more web server modules that provide some additional functionalities.

Rule-generation logic 212 is configured to determine the set of proactive browsing rules 220 in accordance with the techniques described herein, and to store proactive browsing rules 220 in data storage 202. For example, in some embodiments, rule-generation logic 212 may be configured to generate proactive browsing rules in response to user input that defines the conditions and actions for each rule. In some embodiments, rule-generation logic 212 may be configured to determine proactive browsing rules 220 by drawing inferences from the user browsing history and/or by executing machine learning algorithms to deduce at least some of the proactive browsing rules 220. It is noted that several techniques for determining proactive browsing rules are described in more details in a separate section hereinafter; in general, however, rule-generation logic 212 may be configured to determine or learn proactive browsing rules by using any suitable mechanism and information.

Event-detection logic 214 is configured to detect the occurrence of events by receiving, determining, discovering, identifying, or otherwise recognizing an event and/or the event information that represents the event. In operation, event-detection logic 214 may detect an event from an activity, action, or operation that is performed by a process or application executing locally on computing device(s) 200 or by a process or application on a remote computing device. In response to detecting the event, event-detection logic 214 conveys the event information representing the detected event to rule-evaluation logic 216 by using a communication mechanism such as, for example, messaging, shared memory, or any other suitable inter-process communication mechanism.

Rule-evaluation logic 216 is configured to evaluate proactive browsing rules in accordance with the techniques described herein. In response to receiving or being notified about the event information of a detected event, rule-evaluation logic 216 retrieves one or more of the proactive browsing rules 220 from data storage 202 or from a cache in volatile memory (if such cache is available). Rule-evaluation logic 216 then evaluates the retrieved proactive browsing rules to determine whether the conditions defined in the retrieved rules are satisfied by the data values stored in the event information. When rule-evaluation logic 216 determines that a particular rule is satisfied, the rule-evaluation logic notifies automatic redirection logic 218 accordingly. For example, rule-evaluation logic 216 may convey the rule ID and/or the web page identified in the particular rule to automatic redirection logic 218 by using a communication mechanism such as, for example, messaging, shared memory, or any other suitable inter-process communication mechanism.

Automatic redirection logic 218 is configured to automatically redirect, to a particular web page, a web browser that is connected to web server 210 to receive web pages. For example, in response to being notified that a particular rule is satisfied, automatic generation logic 218 causes the web browser to access the web page identified in the particular rule.

In some embodiments, automatic generation logic 218 may cause such browser redirection by generating and sending to the web browser a script (e.g., such as JavaScript, VBScript, etc.). When executed by the web browser, the script causes the web browser to access the web page specified therein, for example, by invoking a browser function or routine that instructs the web browser to retrieve the specified web page.

In some embodiments, automatic redirection logic 218 may cause browser redirection by generating and sending to the web browser an HTTP response message with a "redirect" header that includes a status code beginning with "3", which causes the web browser to go to the web page identified in the "Location" field of the "redirect" header. For example, an HTTP response message with the following header:

```
HTTP/1.1 302 Found
Location: http://sports.yahoo.com/nba/teams/gsw
Content-Type: text/html
Content-Length: 97
``` causes a web browser that receives the message to access the web page located at the URL address "http://sports.yahoo.com/nba/teams/gsw". For example, in response to receiving the HTTP response message with the above "redirect" header, the web browser may execute a script (e.g., such as JavaScript, VB script, etc.) or a browser function or routine that instructs the web browser to retrieve the web page specified in the "Location" field of the header.

In some embodiments, in response to receiving an HTTP response message with a "redirect" header, the web browser may display a pop-up dialog to notify the user why the redirection is occurring and where the redirection is going, and to allow the user to cancel the redirection if he or she so wishes. If within a certain time limit (e.g., a few seconds) the user does not provide input that cancels the redirection (e.g., the user does not click on a "Cancel" button in the pop-up), and without receiving any additional input from the user, the web browser automatically accesses the particular web page that is identified in the "Location" field of the "redirect" header in the received HTTP response message.

FIG. 2B is a block diagram that illustrates an example operational context in which the techniques for proactive web browsing described herein are performed by a web browser. A web browser is a software application which, when executed by one or more computing devices, is allocated computational resources, such as memory, CPU time, and/or disk storage space in order to perform one or more browsing functionalities such as, for example, retrieving, presenting, and traversing web pages provided by web servers on a network and/or files stored on the local computing device.

In FIG. 2B, computing device 250 includes computer data storage 252 and is configured to execute web browser 260. Web browser 260 is configured to access web pages, local files, and other data resources on behalf of a user that uses the web browser. Among components (not shown in FIG. 2B) for performing the various web browser functionalities, web browser 260 includes rule-generation logic 262, event-detection logic 264, rule-evaluation logic 266, and automatic redirection logic 268. In the embodiment illustrated in FIG. 2B, rule-generation logic 262, event-detection logic 264, rule-evaluation logic 266, and automatic redirection logic 268 are included in plug-in module 261 that is installed and configured for web browser 260. However, it is noted that in various embodiments the functionalities of rule-generation logic 262, event-detection logic 264, rule-evaluation logic 266, and automatic redirection logic 268 may be implemented as a browser toolbar, as separate built-in web browser modules, in the same integrated module of the web browser, or may be combined in two or more web browser modules that provide some additional functionalities. Thus, the use of plug-in module 261 in the embodiment of FIG. 2B is to be regarded in an illustrative rather than a restrictive sense.

Rule-generation logic 262 is configured to determine the set of proactive browsing rules 270 in accordance with the techniques described herein, and to store proactive browsing rules 270 in data storage 252. For example, in some embodiments, rule-generation logic 262 may be configured to generate proactive browsing rules in response to user input that is received through a Graphical User Interface (GUI) and that defines the conditions and actions for each rule. In some embodiments, rule-generation logic 262 may be configured to determine proactive browsing rules 270 by drawing inferences from the browsing history of one or more users that use web browser 260 and/or by executing machine learning algorithms to deduce at least some of the proactive browsing rules 270. It is noted that several techniques for determining proactive browsing rules are described in more details in a separate section hereinafter. In some embodiments, rule-generation logic 262 may determine and store proactive browsing rules on a per-user basis—for example, rule-generation logic 262 may determine a separate set of rules for each individual user that uses web browser 260 and may store these rules as part of the user preference settings that are stored in the user's profile maintained by the web browser.

Event-detection logic 264 is configured to detect the occurrence of events by receiving, determining, discovering, identifying, or otherwise recognizing an event and/or the event information that represents the event. In operation, event-detection logic 264 may detect an event from an activity, action, or operation that is performed by a process or application executing locally on computing device 250 or by a process or application on a remote computing device. For example, event-detection logic 264 may periodically check the time clock on computing device 250 to determine whether it is a particular time of the day (e.g., 2:00 pm), which may be a time-based event that can trigger one or more proactive browsing rules. In another example, event-detection logic 264 may receive a notification from an external e-mail service that an e-mail for the user of web browser 260 has been received. In response to detecting the event, event-detection logic 264 conveys the event information representing the detected event to rule-evaluation logic 266 by using a suitable communication mechanism.

Rule-evaluation logic 266 is configured to evaluate proactive browsing rules in accordance with the techniques described herein. In response to receiving or being notified about the event information of a detected event, rule-evaluation logic 266 retrieves one or more of the proactive browsing rules 270 from data storage 252 or from a cache in volatile memory (if such cache is configured and used by web browser 260). Rule-evaluation logic 266 then evaluates the retrieved proactive browsing rules to determine whether the conditions defined in the retrieved rules are satisfied by the data values stored in the event information. When rule-evaluation logic 266 determines that a particular rule is satisfied, the rule-evaluation logic notifies automatic redirection logic 268 accordingly. For example, rule-evaluation logic 266 may convey the rule ID and/or the web page identified in the particular rule to automatic redirection logic 268 by using a suitable communication mechanism.

Automatic redirection logic 268 is configured to automatically redirect web browser 260 to a particular web page. For example, in response to being notified that a particular rule is satisfied, automatic generation logic 268 causes web browser 260 to retrieve and load the web page identified in the particular rule. Automatic generation logic 268 may accomplish this by executing a script (e.g., such as JavaScript, VB script, etc.) or a browser function or routine that instructs web browser 260 to retrieve a new web page.

In some embodiments, automatic redirection logic 268 may be configured to cause web browser 260 to display a pop-up dialog to notify the user why the redirection is occurring and where the redirection is going, and to allow the user to cancel the redirection if he or she so wishes. If within a certain time limit (e.g., a few seconds) the user does not provide input that cancels the redirection (e.g., the user does not click on a "Cancel" button in the pop-up), and without receiving any additional input from the user, automatic redirection logic 268 causes web browser 260 to automatically access the particular web page that is identified in the particular rule which triggered the redirection.

Techniques for Determining Proactive Browsing Rules

Example Rule Structures

According to the techniques described herein, a proactive browsing rule is a set of data that defines one or more conditions and at least one browsing-related action that is to be performed without receiving any additional user input when the one or more conditions are satisfied. In various embodiments, a proactive browsing rule may be stored in any suitable data structures including, but not limited to, as data record(s) in one or more tables, as a set of name-value pairs in a configuration file, as data entries in a directory (e.g., LDAP database or ActiveX directory), and as any other data object conforming to a standard or a proprietary format.

According to the techniques described herein, a proactive browsing rule is associated with a rule identifier (ID) that identifies the rule. The rule ID may be any suitable value (e.g., such as a rule name, rule number, etc.) and may be manually or automatically assigned to the rule when the rule is created and/or stored.

A condition defined in a proactive browsing rule may be based on various parameters that can reflect, or can be otherwise associated with, events and the event information thereof. For example, in some embodiments a condition may be defined by using one or more of the following parameters or any combination thereof:

A user identifier (ID). In embodiments that implement per-user proactive browsing rules, the user ID of a user is associated and stored with each of the proactive browsing rules defined for this user.

Time of day. This parameter specifies datetime values (e.g., such as 3:59 pm, 8:17 am, etc.) that can be used to determine whether time-based events satisfy the condition.

Day of the week. This parameter specifies the days of the week (e.g., Monday, Tuesday, etc.) that can be used to determine whether time-based events defined for particular days of the week satisfy the condition.

Location identifier. This parameter specifies a location that can be used to determine whether the condition is satisfied. For example, the location identifier may be an Internet protocol (IP) address of a computing device that executes a web browser for which the condition is to be evaluated. The location identifier may be used in conjunction with the user ID to define conditions for proactive browsing rules that are both location-specific and user-specific. For example, a user that has a web portal account may define one rule for accessing the portal from a laptop by using the IP address of the laptop, and a different rule for accessing the portal from a desktop computer by using the IP address of the desktop.

Event attributes. Event attribute parameters specify the attribute values that represent the identity and/or the various properties and characteristics of an event. For example, an event ID can identify the source of an event (e.g., a specific internal or external application such as e-mail, RSS feed, etc.). In another example, an event type can identify the type of event (e.g. receiving of new e-mail in inbox, posting of an answer on Y! answers, receiving of a new twitter message, etc.). In general, any data value included in the event information can be used as an event attribute parameter to define the condition(s) of a proactive browsing rule. Thus, the techniques described herein are not limited to using any specific or particular event attributes to define conditions in proactive browsing rules, and for this reason the event attributes described herein are to be regarded in an illustrative rather than a restrictive sense.

In the context of the techniques described herein, a browsing-related action is an action or operation that can be performed by a web browser on behalf of a user. A typical browsing-related action is a redirection operation, in which a web browser is redirected to a web page that is different from the web page currently displayed in the browser or in a tab thereof. It is noted, however, that the techniques for proactive web browsing described herein are not limited to actions that are redirection operations. Rather, various embodiments may utilize and implement proactive browsing rules that can specify any browsing-related action that can be performed automatically without requiring additional and/or interactive input from the user and that can enhance the browsing experience of the user.

According to the techniques described herein, a proactive browsing rule can define an action and one or more parameters of the action. For example, in a particular proactive browsing rule, the action can be defined as "go to" (which specifies a redirection operation) and a parameter of the action can be defined as "http://sports.yahoo.com/nba/teams/gsw". When the conditions defined in this particular proactive browsing rule are satisfied, the performance of the above action would cause a web browser to access the web page at the URL address of "http://sports.yahoo.com/nba/teams/gsw". In various embodiments, an action parameter that is used to identify a web page can be specified in various formats or forms. For example, in some embodiments the parameter may specify the URI of a web page (e.g., such as URL address). In another example, some embodiments may specify a set of values that can be directly or indirectly used to generate a web page identifier on the fly; this functionality may be useful in situations that require dynamic generation of the URL address of the web page towards which the proactive browsing action is directed.

In some embodiments, in addition to conditions and actions, a proactive browsing rule may include one or more additional attributes. For example, a proactive browsing rule may include a scheduling attribute, where the value of this attributes defines the days/times at which the rule is to be evaluated (e.g., the attribute value may be "Monday-Friday, 8:00 am to 5:00 pm", which indicates that the rule is to be evaluated only during regular business hours). In another example, a proactive browsing rule may include a status attribute, where the value of this attribute indicates whether the rule is active or inactive (e.g., this attribute would allow the user to turn the rule on or off). It is noted that the techniques described herein are not limited to any particular types of rule attributes, and for this reason the examples of rule attributes provided herein are to be regarded in an illustrative rather than a restrictive sense.

In some embodiments, the techniques described herein provide for prioritizing the rules in a set of proactive browsing rules. Each rule in a set of proactive browsing rules may be assigned a priority number or value, and during operation the rules in the set are evaluated in the order of their priority numbers or values. The priority of the rules may be set manually by a user or may be automatically assigned based on heuristics.

For example, if a particular user places a higher priority on checking e-mail, the techniques described herein allow the user to assign the highest priority to a mail-check rule that defines a redirection action to the user's web e-mail page. Thus, when the proactive browsing rules associated with the user are evaluated, the mail-check rule is evaluated first since it has the highest priority and the user will be automatically redirected to access her web e-mail page provided that the conditions specified in the mail-check rule are satisfied (e.g., such conditions may be based on the time of day, on the time elapsed since the last time the web e-mail page was accessed, etc.). It is noted that the techniques described herein allow the user to turn the mail-check rule on or off as desired, and/or to schedule the evaluation of this rule only during some days and times thereof.

Example Mechanisms for Rule Determination

According to the techniques described herein, proactive browsing rules can be created by using least three approaches. In the first approach, proactive browsing rules are generated in response to user input that defines the conditions and actions included in the rules. In the second approach, proactive browsing rules are automatically generated based on the browsing history of one or more users or by using event-based machine-learning techniques. The approach is a hybrid approach in which a proactive browsing rule is first automatically generated and is thereafter suggested to the user, thereby allowing the user to edit, accept, and/or reject the rule.

For example, in some embodiments a web browser presents a GUI form to a user, and user input received through the GUI form is used to generate the proactive browsing rule(s) entered by the user. The proactive browsing rules generated for the user may be stored as user preference settings in the web-browser (in a client-side implementation of the techniques described herein) or as settings associated with a user account in a web portal (in a server-side implementation of the techniques described herein).

In some embodiments, proactive browsing rules may be determined automatically based on the browsing history of a user. For example, one mechanism for automatically determining a rule may include the following steps. First, a rule-generation logic (e.g., in a web server or a web browser) keeps track or log of the web pages visited by a user and the events that precede or cause the user to visit specific web pages. For example, the rule-generation logic may keep a log with the browsing history of the user and may gather additional context information for each visited web page such as, for example: the user ID of the user; the location identifier (e.g., the IP address) of the computing device used by the user to access a given web page; the day of the week and the time of day when the user visited the given web page; and any event information that is available for events that were detected immediately prior to the user visiting the given web page. After the rule-generation logic determines that the user has visited a particular web page a certain threshold number of times (e.g., 5 times) in response to the same event, the rule-generation logic automatically generates a candidate rule. The conditions in the candidate rule are based on attributes of that event and/or on the context information gathered by the rule-generation logic for that particular web page. The action in the candidate rule is a redirection operation to the particular web page, which is identified in the candidate rule by a web page address or some other identifier. After generating the candidate rule, the rule-generation logic may automatically store the candidate rule as a proactive browsing rule. Alternatively, the rule-generation logic may cause a web browser to display the candidate rule to the user and to prompt the user to edit, accept, and/or reject the rule. If the user provides input that edits and accepts the candidate rule, the rule-generation logic stores the edited candidate rule as a proactive browsing rule. If the user rejects the candidate rule, the rule-generation logic discards the candidate rule and may provide the user with the option to re-configure one or more parameters (e.g., such as the threshold number of visits) that were used to generate the candidate rule.

According to the techniques described herein, proactive browsing rules may be determined automatically based on the browsing history of multiple users. For example, in some embodiments the techniques described herein may be implemented on one or more web servers that support a web portal that is used by a large number of users. In these embodiments, the web servers may keep track or log of the web pages that are visited by multiple users along with various context information associated with a given web page. When the web servers determine (based on configurable threshold parameters) that a particular web page is of common interest to multiple users of the web portal, the web servers may generate a candidate rule that specifies conditions and redirection action to the particular web page in the manner described above. The web servers may then suggest the candidate rule to one or more users for edit/approval. For example, the web servers can store the candidate rule in the personalized preferences page of a given user, and may send a message to the user to review the candidate rule. The user may then edit and accept, or reject, the candidate rule by accessing her preferences page and providing the necessary input.

In some embodiments, a proactive browsing rule may define conditions that are satisfied by a time-based event that can occur within a given window of time. For example, the rule-generation logic (e.g., in a web server or a web browser) may determine that a particular user visits the same web page in intervals of time that are roughly equal. For example, based on the browsing history of the user, the rule-generation logic may determine that during normal business hours the user visits his web e-mail page about once in every hour and a half. In response to determining this, the rule-generation logic may automatically determine a proactive browsing rule, in which the conditions specify a 90-minute timer that is based on the system clock and a redirection action that specifies the web e-mail page of the user. In operation, in response to detecting that the time on the system clock indicates that the 90-minute timer has expired, a rule-evaluation logic (e.g., in a web server or a web browser) determines that the rule is satisfied and notifies an automatic redirection logic which automatically redirects the user to her web e-mail page.

In some embodiments, the rule-generation logic may determine a proactive browsing rule in which the condition is a time window of a certain number of minutes/hours, whereas detecting the occurrence of an event within this time window (as opposed to exact time) will cause the action specified in the rule to be performed. To determine such rule, a rule-generation logic (e.g., in a web server or a web browser) first determines a generic pattern by recognizing repeating visits to the same particular web page (e.g., based on a threshold number). Then, the rule-generation logic may determine the most common or average time at which such visits have occurred and may determine such time window around the common/average time that a certain threshold percentage (e.g., at least 60%) of the visits to the particular web page would fall within this time window. The rule-generation logic may then use the determined time window to define a condition for a proactive browsing rule that specifies a redirection action to the particular web page. In this manner, the techniques described herein provide for automatically determining rules that can specify conditions based on a different time-related granularity.

According to the techniques described herein, some embodiments may use event-based machine-learning mechanisms to automatically determine proactive browsing rules. For example, based on event information of previously detected events, a machine-learning mechanism can detect that event C occurs after events A and B, so after a sufficient threshold number of such detections, the mechanism may infer that that event C is invoked in response to the occurrence of events A and B. For example, in the context of the techniques described herein, event A may be a specific day of the week, event B may a specific time during the day, and event C may be the user accessing a particular web page. In accordance the techniques described herein, based on such inference, a rule-generation logic (e.g., in a web server or a web browser) may automatically determine a proactive browsing rule in which the conditions are based on a day and time parameters and in which the action is a redirection action to the particular web page.

In some embodiments, the techniques described herein provide for prioritizing the rules in a set of proactive browsing rules based on a dynamic priority. For example, if a user visits a given web page 10 times a day, a rule-generation logic may assign a priority to a rule redirecting to this given web page that is higher than the priority assigned to another rule that redirects to a web page that is visited by the user only once a day. Further, the rule-generation logic may keep track of the frequencies with which web pages specified in the proactive browsing rules are visited, and may dynamically re-calculate the priorities assigned to the rules based on the tracked frequencies.

Operational Example

Figure 3:
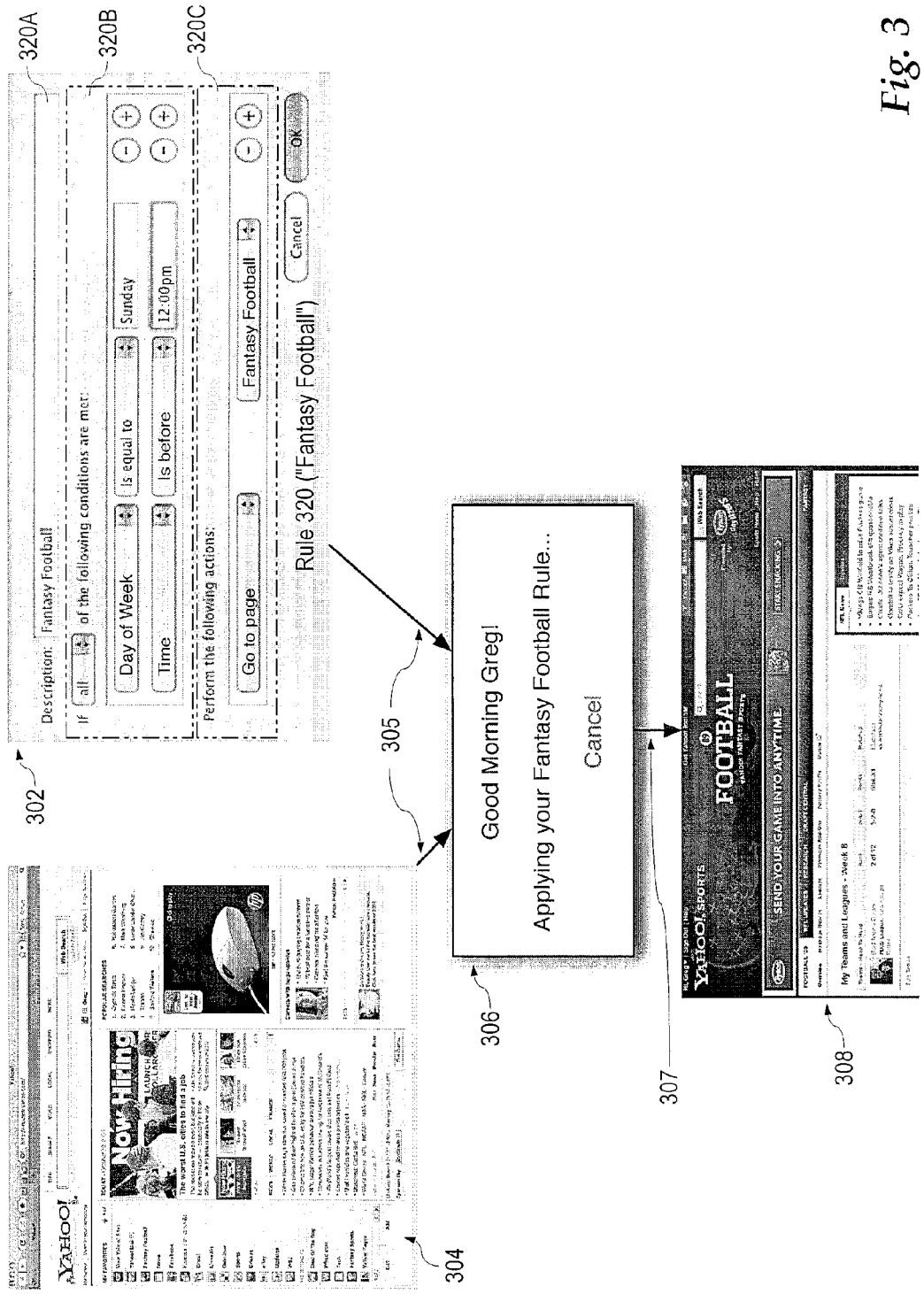
FIG. 3 is a block diagram that illustrates an operational example according to one embodiment.

FIG. 3 is a block diagram that illustrates an operational example according to one embodiment. The operational example in FIG. 3 is described in the operational context of a web portal that provides access to one or more web sites to a large number of users. The web portal provides to the users an umbrella login functionality, which allows the users to seamlessly access various services (e.g., news, RSS feeds, e-mail, etc.) that are hosted on various servers. For example, the web sites in the portal include web pages that are provided by one or more web servers, and the web pages include content that is provided by one or more e-mail servers, one or more RSS feed servers, one or more database servers, etc.

According to the techniques described herein, a web server or a component thereof (e.g., a rule-generation logic) causes a web browser to display GUI form 302 to user "Greg". GUI form 302 receives input from user "Greg" that defines and/or edits one or more proactive browsing rules, such as rule 320.

Rule 320 includes rule ID 320A which, as illustrated in FIG. 3, is named "Fantasy Football". Rule 320 also includes conditions 320B and action 320C. Conditions 320B specify that a "day of the week" parameter is set to "Sunday" and that a "time" parameter is set to "before 12:00 pm". Action 320C specifies the redirection operation "go to" and the parameter of the redirection operation as the web page "Fantasy Football". (It is noted that the label "Fantasy Football" in the list box is mapped to the URL address of the web page that stores the "Fantasy Football" content.)

In operation, user "Greg" visits the web portal and logs in by providing a username and a correct password in web browser 304. An authentication server or service raises a login event in response to successfully authenticating user "Greg". A web server or a component thereof (e.g., an event-detection logic) detects the login event by, for example, receiving an indication of successful login and the user ID of user "Greg" from the authentication server or service. The web server or the component thereof then gathers various event information that, among other values, includes a value indicating that the current day of the week is "Sunday", and a value indicating that the current time is "10:21 am".

In response to receiving the event information and the user ID, according to the techniques described herein, the web server or a component thereof (e.g., a rule-evaluation logic) uses the user ID to locate and retrieve the set of proactive browsing rules that are associated with the user ID (i.e., with user "Greg"). Rule 320 ("Fantasy Football") is included in the retrieved set because it is associated with user "Greg". Then, the web server or the component thereof uses the event information to determine whether any of the retrieved rules are satisfied. For example, the web server or the component thereof compares the values in the event information (e.g., the value indicating that the current day of the week is "Sunday", and the value indicating that the current time is "10:21 am") to the parameter values specified in the conditions in each of the retrieved rules. Since the value indicating the current day of the week matches the "day of the week" parameter value in conditions 320B, and since the value indicating the current time satisfies the value of the "time" parameter in conditions 320B, the web server or the component thereof determines that rule 320 is satisfied. (It is noted that the determination that rule 320 is satisfied is not based on user "Greg" opening browser 304 and logging in; rather, this determination is made based on time-related information that is collected after user "Greg" has logged in. For example, if user "Greg" had logged in on a Friday, rule 320 would not have been satisfied because the "day of the week" parameter defined in rule 320 would not match to the current day of the week value of "Friday". In other words, rule 320 would not be satisfied every time user "Greg" logs in, but would only be satisfied when the conditions defined in rule 320 are satisfied.)

In response to determining that rule 320 is satisfied, the web server or a component thereof (e.g., an automatic redirection logic) causes web browser 304 to perform action 320C, which is defined in rule 320 as a redirection action to web page "Fantasy Football". For example, the web server or the component thereof may send to web browser 304 a script (e.g., such as JavaScript, or VBScript) that identifies the URL address of web page "Fantasy Football" and that causes the web browser to load that web page. Alternatively, the web server or the component thereof may send to browser 304 an HTTP response message with a "redirect" header, which stores the status code "302" and identifies the URL address of the "Fantasy Football" web page in a "Location" field.

In response, as indicated in 305, web browser 304 displays pop-up window 306 to user "Greg". Pop-up window 306 notifies user "Greg" that the "Fantasy Football" rule is being applied, and provides a "Cancel" button which allows user "Greg" to cancel the redirection. After waiting for a few seconds (e.g., 2 seconds), web browser 304 determines that no input has been received from user "Greg" to cancel the redirection. Then, as indicated in 307, and without receiving any additional and/or interactive input from the user, web browser 304 automatically retrieves and displays the "Fantasy Football" web page 308.

In this manner, the techniques for proactive web browsing described herein allow the web portal to automatically navigate the user to the particular web page that the user wants to see based on the particular context at that particular time. This enhances the user browsing experience because it allows the web portal to intelligently re-route and navigate the user to where the user wants and intends to go without requiring the user provide additional input by typing a specific URL address or by clicking through one or more links to intervening web pages that are not of interest to the user at that particular time.

Use Case: Proactive Web Browsing in Response to Time-Based Events

Figure 4:
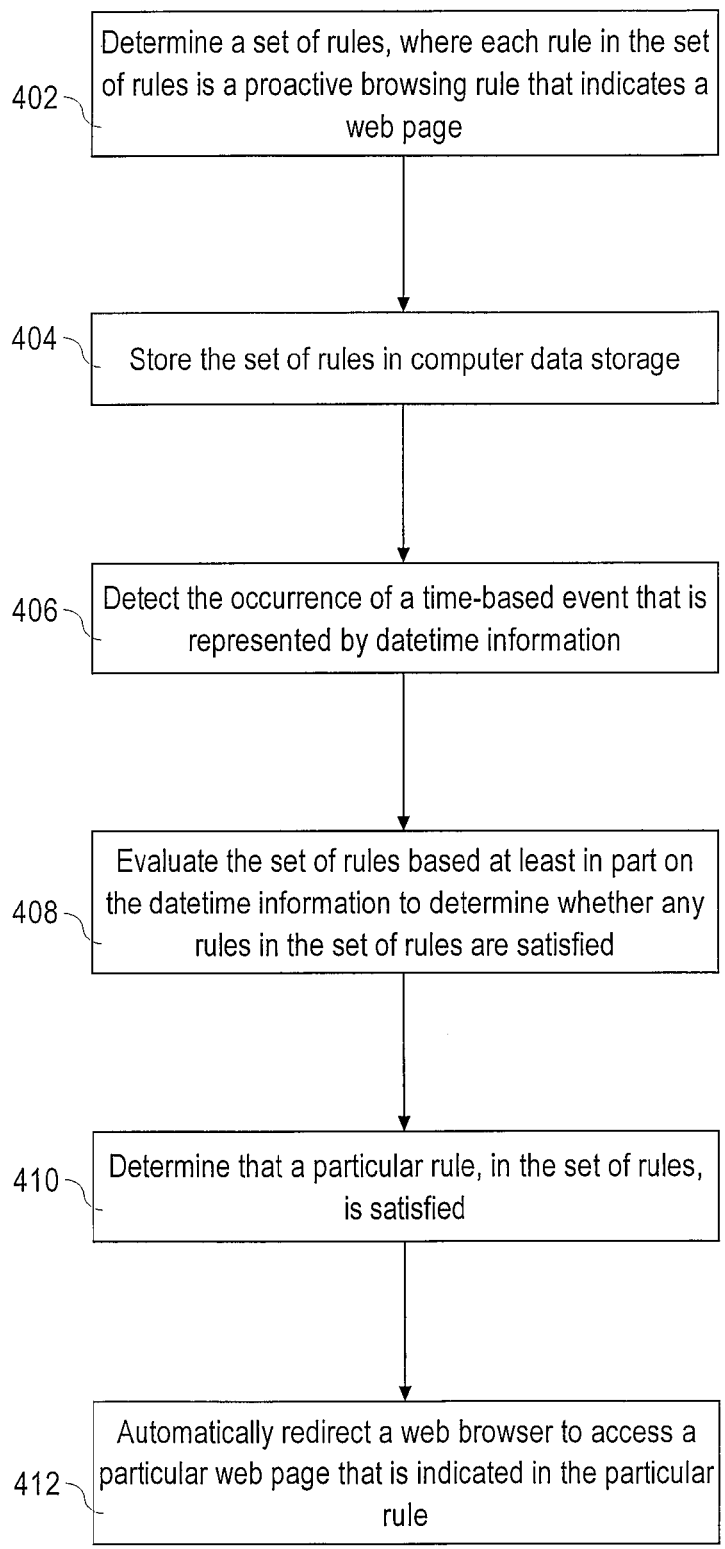
FIG. 4 is a flow diagram that illustrates an example method for proactive web browsing in a use case of time-based events according to one embodiment.

FIG. 4 is a flow diagram that illustrates an example method for proactive web browsing in response to time-based events. For illustration purposes, the steps of the method in FIG. 4 are described hereinafter as being performed by a web server that is executing on one or more computing devices. However, it is noted that in various embodiments and operational contexts the steps of the method in FIG. 4 may be performed by software and/or hardware components other than a web server; for example, in some embodiments the steps of the method in FIG. 4 may be performed by a web browser that is executing on a computing device.

In step 402, a web server or a component thereof determines a set of proactive browsing rules. Each rule in the set indicates a web page that is to be accessed directly by a web browser without receiving any additional and/or interactive user input that directly or indirectly identifies the web page.

In step 404, the web server or a component thereof stores the set of proactive browsing rules in computer data storage.

In step 406, the web server or a component thereof detects the occurrence of a time-based event that is represented by datetime information. In the context of the techniques described herein, "time-based" event refers to an event that is associated with at least one date and/or time parameter that is specified in the conditions of the proactive browsing rules, and "datetime" information refers to values of one or more date and/or time components that include, but are not limited to, year, quarter of the year, week of the year, month, day of the month, day of the week, and time of day in any combination of hours, minutes, seconds, milliseconds, etc.

In response to detecting the occurrence of the time-based event, in step 408 the web server or a component thereof evaluates the set of proactive browsing rules to determine whether any rules in the set of rules are satisfied. For example, the web server or the component thereof evaluates one or more conditions associated with each rule based on the datetime information that represents the detected time-based event.

In step 410, while a web browser associated with the rules being evaluated is in use, the web server or a component thereof determines that a particular proactive browsing rule, in the set of rules, is satisfied. For example, the web server may determine that one or more data values included in the datetime information match, or otherwise satisfy, the one or more conditions defined in the particular rule.

In response to determining that the particular rule is satisfied, in step 412 the web server or a component thereof automatically redirects the web browser to access a particular web page that is indicated in the satisfied particular rule. For example, the web server or the component thereof causes the web browser to be redirected from the current web page that is displayed in the web browser to the particular web page that is specified in the satisfied particular rule. The automatic redirection of the web browser is performed without receiving, from the user that is using the web browser, any additional and/or interactive input that identifies the particular web page to which the web browser is redirected.

Use Case: Proactive Web Browsing in Response to Electronic Messages

Figure 5:
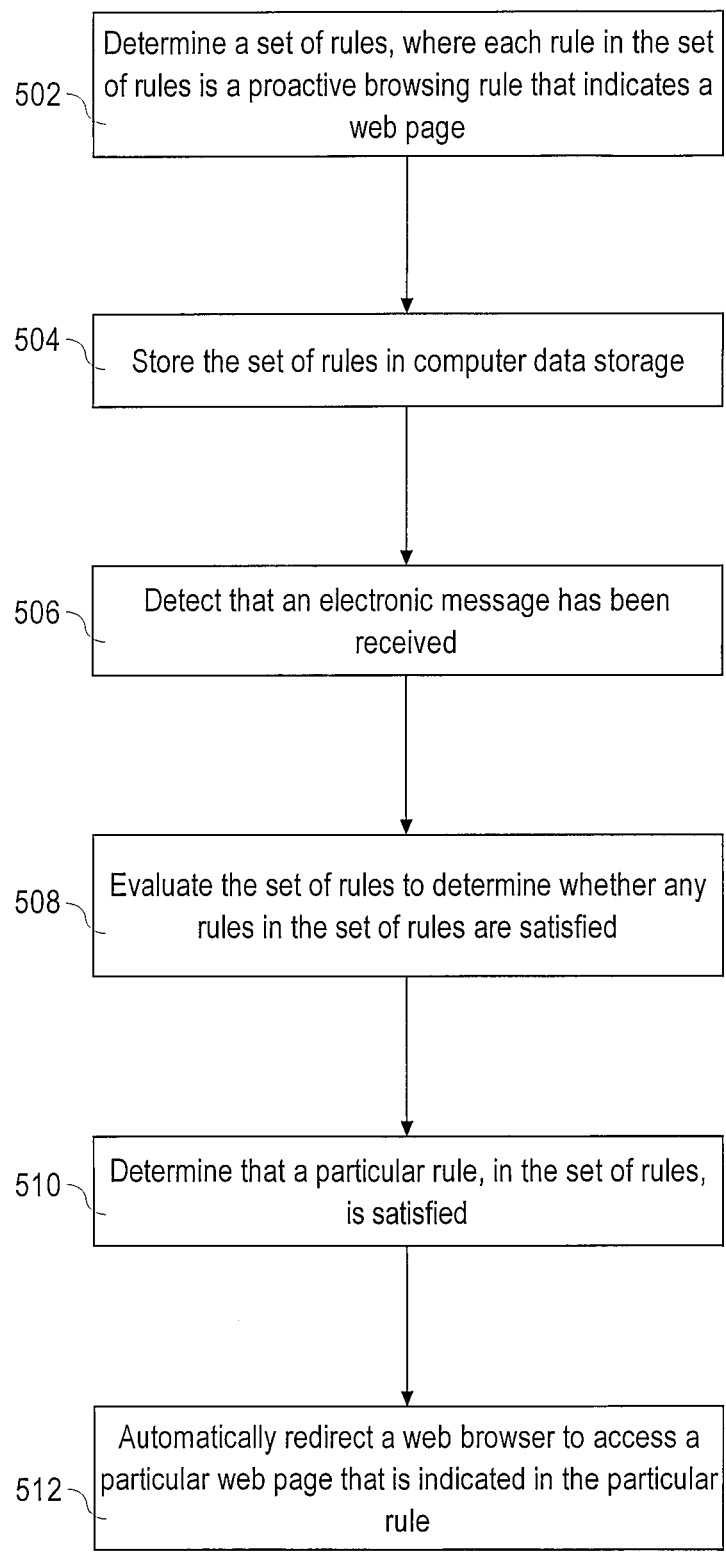
FIG. 5 is a flow diagram that illustrates an example method for proactive web browsing in a use case of electronic messages according to one embodiment.

FIG. 5 is a flow diagram that illustrates an example method for proactive web browsing in response to electronic messages. For illustration purposes, the steps of the method in FIG. 5 are described hereinafter as being performed by a web server that is executing on one or more computing devices. However, it is noted that in various embodiments and operational contexts the steps of the method in FIG. 5 may be performed by software and/or hardware components other than a web server; for example, in some embodiments the steps of the method in FIG. 5 may be performed by a web browser that is executing on a computing device.

In step 502, a web server or a component thereof determines a set of proactive browsing rules. Each rule in the set indicates a web page that is to be accessed directly by a web browser without receiving any additional and/or interactive user input that directly or indirectly identifies the web page.

In step 504, the web server or a component thereof stores the set of proactive browsing rules in computer data storage.

In step 506, the web server or a component thereof detects that an electronic message for the user has been received. In the context of the techniques described herein, "electronic message" refers to an electronic communication that is transmitted over a network. Examples of electronic messages include, but are not limited to, e-mail messages, RSS feed updates, tweeter messages, and the like. To detect an electronic message, the web server or the component thereof may request and/or receive a notification that the electronic message has been received by the web server (or a component thereof) or by some other server or service that is associated with the web server or to which the web server has access. For example, in a web portal setting, the web server may receive a notification from an e-mail server that provides e-mail services to users of the web portal.

In embodiments that are implemented on a web browser, the web browser or a component thereof (e.g., a plug-in module or a toolbar) can detect the receipt of electronic communications through an Application Programming Interface (API) that allows the web browser to receive "push" events from external applications and remote servers or services. For example, the web browser may provide logic that allows the user to register with remote servers or services to receive "push" events that indicate the receipt of one or more types of electronic messages.

In response to detecting that the electronic message has been received, in step 508 the web server or a component thereof evaluates the set of proactive browsing rules to determine whether any rules in the set of rules are satisfied.

In step 510, while a web browser associated with the rules being evaluated is in use, the web server or a component thereof determines that a particular proactive browsing rule, in the set of rules, is satisfied. For example, the web server or the component thereof may determine that the conditions defined in the particular rule require receipt of an electronic message in order to be satisfied, and that the received electronic message has a type that satisfies these conditions.

In response to determining that the particular rule is satisfied, in step 512 the web server or a component thereof automatically redirects the web browser to access a particular web page that is indicated in the satisfied particular rule. For example, the web server or the component thereof causes the web browser to be redirected from the current web page that is displayed in the web browser to an web e-mail page that is specified in the satisfied particular rule. The automatic redirection of the web browser is performed without receiving, from the user that is using the web browser, any additional and/or interactive input that identifies the web e-mail page to which the web browser is redirected.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
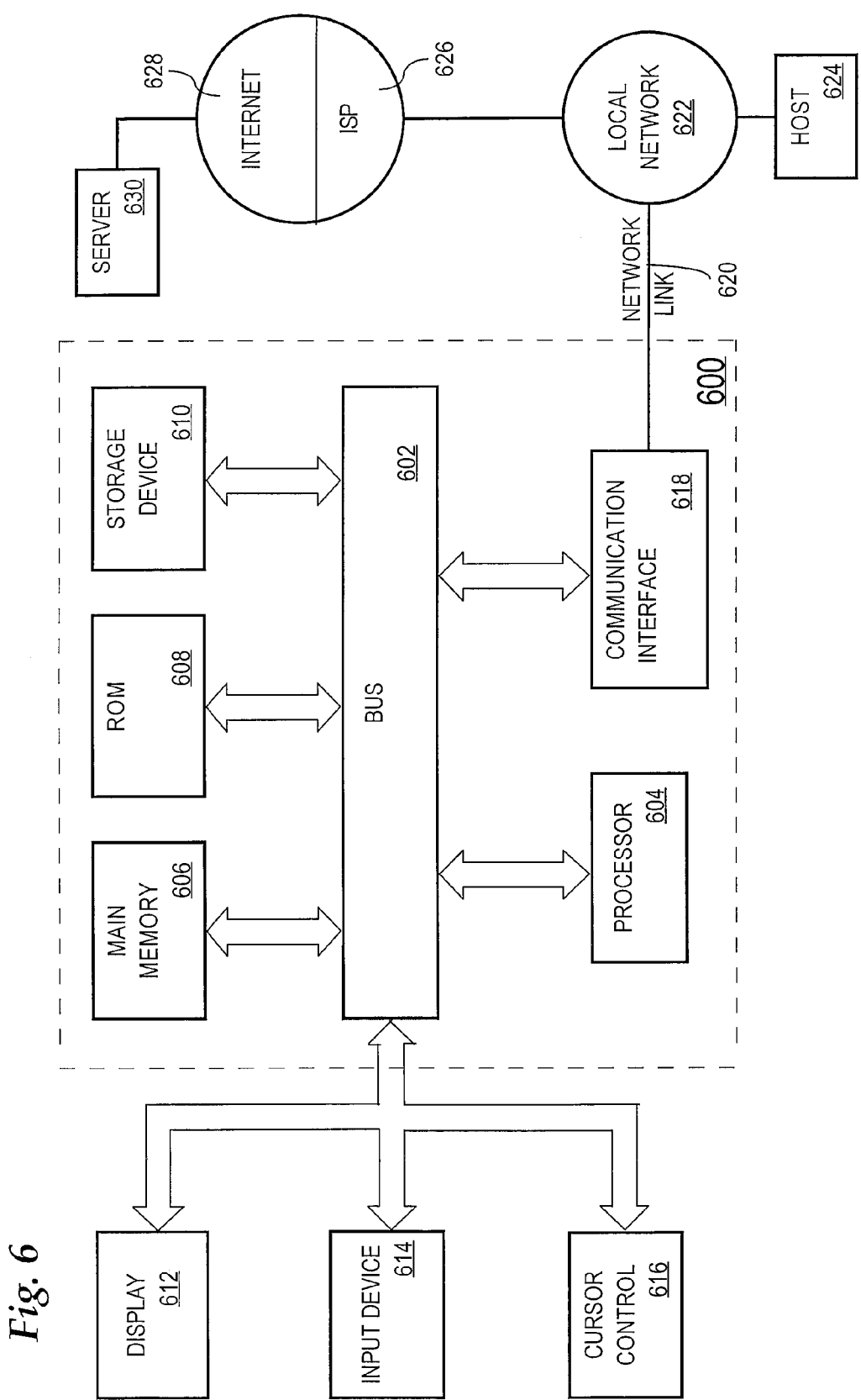
FIG. 6 is a block diagram that illustrates an example computing device on which embodiments may be implemented.

For example, FIG. 6 is a block diagram that illustrates a computer system 600 upon which an embodiment of the techniques described herein may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or a Liquid Crystal Display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques for proactive web browsing described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of proactive web browsing comprising:
  determining a set of rules, wherein each rule in the set of rules indicates a web page that is to be accessed directly by a client executing a web browser, wherein one or more rules in the set of rules is automatically determined based on prior browsing history;
  storing the set of rules in computer data storage;
  detecting occurrence of an event that is represented by event information;
  in response to detecting the occurrence of the event, evaluating the set of rules based on the event information to determine whether any rules in the set of rules are satisfied;
  determining that a particular rule, in the set of rules, is satisfied;
  in response to determining that the particular rule is satisfied without receiving user input from the client, causing an automatic redirecting of the web browser to access a particular web page that is indicated in the particular rule without accessing one or more intervening web pages to reach the particular web page;
  wherein the method is performed by one or more computing devices.

2. The method of claim 1, wherein automatically determining the one or more rules of the set of rules comprises:
  automatically determining a candidate rule based on the prior browsing history;
  causing the web browser to display the candidate rule to a user;
  receiving user input that edits the candidate rule; and
  including the edited candidate rule in the set of rules.

3. The method of claim 1, wherein determining the set of rules comprises
  receiving user input that defines one or more rules of the set of rules.

4. The method of claim 1, wherein the set of rules is associated with a particular user of a plurality of users, and wherein determining the set of rules comprises
  automatically determining at least one rule in the set of rules based at least in part on prior browsing history of the plurality of users.

5. The method of claim 1, wherein:
  determining the set of rules comprises arranging the set of rules according to a priority order; and
  evaluating the set of rules comprises evaluating the set of rules in the priority order.

6. The method of claim 1, further comprising:
  in response to determining that the particular rule is satisfied, causing the web browser to display a notification that prompts for input whether to cancel redirection to the particular web page; and
  automatically redirecting the web browser to access the particular web page when no input to cancel the redirection to the particular web page is received.

7. The method of claim 1, wherein the event information includes one or more of:
  first data that indicates an identifier of a particular user from a plurality of users;
  second data that indicates a time of day;
  third data that indicates a day of the week;
  fourth data that indicates a particular network location; and
  fifth data that indicates an action that caused the occurrence of the event.

8. The method of claim 1, wherein detecting the occurrence of the event comprises
  receiving, from an external application, a notification indicating the occurrence of the event and the event information.

9. The method of claim 1, wherein the set of rules is associated with a particular user of a plurality of users, and wherein the method further comprises:
  based on the event information, determining an identifier of the particular user; and
  locating the set of rules in the computer data storage based on the identifier of the particular user.

10. A method of proactive web browsing comprising:
  determining a set of rules, wherein each rule in the set of rules is a proactive browsing rule that indicates a web page;
  storing the set of rules in computer data storage;
  detecting occurrence of a time-based event that is represented by datetime information by gathering event information that indicates at least a current day and a current time;
  in response to detecting the occurrence of the time-based event, evaluating the set of rules based at least in part on the datetime information to determine whether any rules in the set of rules are satisfied;
  while a web browser is in use, determining that a particular rule, in the set of rules, is satisfied;
  in response to detecting the occurrence of the time-based event and determining that the particular rule in the set of rules is satisfied based on the occurrence of the time-based event, automatically redirecting the web browser to access a particular web page that is indicated in the particular rule without receiving, from a user that is using the web browser, any additional or interactive input that identifies the particular web page to which the web browser is redirected, wherein the particular web page is accessed directly by a client executing the web browser without accessing one or more intervening web pages to reach the particular web page;
  wherein the method is performed by one or more computing devices.

11. A method of proactive web browsing comprising:
  determining, by a web server, a set of rules, wherein each rule in the set of rules is a proactive browsing rule that indicates a web page;
  storing, by the web server, the set of rules in computer data storage;
  detecting, by the web server, that an electronic message has been received from a third party that is different than the web server, the electronic message directed towards a user of a web browser, wherein the user is different than the third party;
  in response to detecting that the electronic message has been received, evaluating, by the web server, the set of rules to determine whether any rules in the set of rules are satisfied;
  while the web browser is in use, determining, by the web server, that a particular rule, in the set of rules, is satisfied wherein a condition defined in the particular rule requires receipt of the electronic message in order for the particular rule to be satisfied; and
  in response to determining that the particular rule is satisfied without receiving input from the user, the web server automatically redirecting the web browser to access a particular web page that is indicated in the particular rule that is to be accessed directly by a client executing the web browser without accessing one or more intervening web pages to reach the particular web page;

wherein the method is performed by one or more computing devices.

12. One or more non-transitory storage media storing instructions which, when executed by one or more computing devices, cause performance of the method recited in claim 1.

13. One or more non-transitory storage media storing instructions which, when executed by one or more computing devices, cause performance of the method recited in claim 2.

14. One or more non-transitory storage media storing instructions which, when executed by one or more computing devices, cause performance of the method recited in claim 3.

15. One or more non-transitory storage media storing instructions which, when executed by one or more computing devices, cause performance of the method recited in claim 4.

16. One or more non-transitory storage media storing instructions which, when executed by one or more computing devices, cause performance of the method recited in claim 5.

17. One or more non-transitory storage media storing instructions which, when executed by one or more computing devices, cause performance of the method recited in claim 6.

18. One or more non-transitory storage media storing instructions which, when executed by one or more computing devices, cause performance of the method recited in claim 7.

19. One or more non-transitory storage media storing instructions which, when executed by one or more computing devices, cause performance of the method recited in claim 8.

20. One or more non-transitory storage media storing instructions which, when executed by one or more computing devices, cause performance of the method recited in claim 9.

21. One or more non-transitory storage media storing instructions which, when executed by one or more computing devices, cause performance of the method recited in claim 10.

22. One or more non-transitory storage media storing instructions which, when executed by one or more computing devices, cause performance of the method recited in claim 11.

* * * * *